(12) United States Patent
Ellgardt

(10) Patent No.: US 9,705,198 B2
(45) Date of Patent: Jul. 11, 2017

(54) COMBINED ANTENNA, ANTENNA ARRAY AND METHOD FOR USING THE ANTENNA ARRAY

(75) Inventor: Anders Ellgardt, Sundbyberg (SE)

(73) Assignee: SAAB AB, Linköping (SE)

( * ) Notice: Subject to any disclaimer, the term of this patent is extended or adjusted under 35 U.S.C. 154(b) by 319 days.

(21) Appl. No.: 14/372,954

(22) PCT Filed: Jan. 17, 2012

(86) PCT No.: PCT/SE2012/050035
§ 371 (c)(1),
(2), (4) Date: Dec. 1, 2014

(87) PCT Pub. No.: WO2013/109173
PCT Pub. Date: Jul. 25, 2013

(65) Prior Publication Data
US 2015/0102962 A1    Apr. 16, 2015

(51) Int. Cl.
| | | |
|---|---|---|
| H01Q 3/00 | (2006.01) | |
| H01Q 9/16 | (2006.01) | |
| H01Q 21/06 | (2006.01) | |
| H01Q 25/00 | (2006.01) | |
| H01Q 3/34 | (2006.01) | |
| H01Q 21/00 | (2006.01) | |
| G01S 13/10 | (2006.01) | |
| G01S 13/02 | (2006.01) | |

(52) U.S. Cl.
CPC .............. *H01Q 9/16* (2013.01); *H01Q 3/34* (2013.01); *H01Q 21/00* (2013.01); *H01Q 21/062* (2013.01); *H01Q 25/00* (2013.01); *G01S 13/10* (2013.01); *G01S 2013/0245* (2013.01)

(58) Field of Classification Search
USPC ........ 342/368, 369, 426, 371, 372; 343/722, 343/793, 795, 700 MS
See application file for complete search history.

(56) References Cited

U.S. PATENT DOCUMENTS

| | | |
|---|---|---|
| 4,382,260 A | 5/1983 | Ranghelli |
| 5,313,218 A | 5/1994 | Busking |
| 5,532,708 A | 7/1996 | Krenz et al. |

(Continued)

FOREIGN PATENT DOCUMENTS

| | | |
|---|---|---|
| CN | 102017301 A | 4/2011 |
| EP | 0474490 A1 | 3/1992 |
| GB | 2176660 A | 12/1986 |

OTHER PUBLICATIONS

Supplementary European Search Report—Aug. 12, 2015 (Issued in Counterpart Application No. 12866293.9).

(Continued)

*Primary Examiner* — Dao Phan
(74) *Attorney, Agent, or Firm* — Venable LLP; Jeffri A. Kaminski

(57) ABSTRACT

An antenna including a dipole antenna element having central feeding points, a common mode rejection filter, a first length of a two-conductor transmission line, and a common mode rejection filter arranged and connected between a far end of the first length of the two-conductor transmission line and the feeding points of the dipole antenna element. The first length of the two-conductor transmission line is arranged to extend from a ground plane to a first height where the first length of the two-conductor transmission line is connected to the common mode rejection filter.

16 Claims, 8 Drawing Sheets

(56) References Cited

U.S. PATENT DOCUMENTS

| | | |
|---|---|---|
| 7,289,080 B1 | 10/2007 | Bohlman |
| 2006/0262026 A1 | 11/2006 | Gainey et al. |
| 2010/0297972 A1 | 11/2010 | Van Den Elzen |
| 2011/0163928 A1 | 7/2011 | Klos et al. |

OTHER PUBLICATIONS

PCT/ISA/210—International Search Report—Sep. 18, 2012 (Issued in Application No. PCT/SE2012/050035).
PCT/ISA/237—Written Opinion of the International Searching Authority—Sep. 18, 2012 (Issued in Application No. PCT/SE2012/050035).
Chinese Patent Office—Notification of the First Office Action (With Translation)—Jul. 8, 2015 (Issued in Counterpart Application No. CN 201280067252.5).

COMBINED ANTENNA, ANTENNA ARRAY AND METHOD FOR USING THE ANTENNA ARRAY

CROSS-REFERENCE TO RELATED APPLICATIONS

The application is the national phase under 35 U.S.C. §371 of PCT/SE2012/050035 filed 17 Jan. 2012.

TECHNICAL FIELD

The present invention relates to an antenna. More specifically it relates to a combination of monopole and dipole antenna elements. The invention also relates to an array antenna making use of these combined antenna elements.

BACKGROUND ART

Dipole antennas are well known in the art. Monopole antennas are well known in the art. A combination of a dipole antenna and a monopole antenna are known from e.g. U.S. Pat. No. 5,313,218 which discloses an antenna assembly including a dipole antenna and a monopole antenna having substantially perpendicular polarization directions. The dipole antenna is provided with a balun a portion of which serves as a backplane for a micro strip transmission line which transmits RF signals. The micro strip transmission line includes a first portion connected to a coaxial feed cable, a second portion having its ends respectively connected by a first switch to the monopole antenna and a second switch to the balun portion and a third portion. Closing the switches renders the monopole antenna operative. The third portion serves to detune the dipole antenna.

U.S. Pat. No. 7,289,080 disclose an antenna of dipole and monopole antenna elements with filtering to achieve a greater bandwidth. The multiple antenna elements are isolated or combined in order to provide a self adjusting electrical length by using multiterminal filtering.

Patent application US 2011/0163928 discloses an antenna comprising a monopole and a dipole. The dipole provides a first antenna element and a second antenna element, which provide a common longitudinal axis with the longitudinal axis of a monopole. The first antenna element of the dipole is connected to the second antenna element of the dipole and to the monopole. The monopole bears the dipole. The antenna further contains a decoupling element, which is disposed between the monopole and the dipole.

SUMMARY OF THE INVENTION

The inventor has studied how to improve active phased array antennas and particularly how to improve antennas where directivity is accomplished by organising a number of antennas in a regular or non-regular array. The invention is a combined antenna comprising a dipole antenna element combined with a monopole antenna element, which by means of inventive features has been given the same resonance frequency. Multiples of the antennas are particularly suitable to be arranged in such regular or non-regular arrays.

The combined antenna comprises a dipole part, a common-mode rejection filter and a two-conductor transmission line that acts both as a dipole feed and as a monopole. The transmission line is arranged to transfer currents in an arbitrary combination of a common mode and a differential mode. The common-mode rejection filter is designed to prevent a common-mode current from entering the dipole part of the antenna element, while it lets a differential-mode current pass through in order to excite the dipole. The transmission line is arranged as normal to a ground plane and can be considered as two separate transmission line parts that are co-axial. A first length of transmission line starts at the port at the ground plane and reaches to a first end of the common mode rejection filter where it connects. A second length of transmission line is arranged to connect to a second end of the common mode rejection filter and to the dipole. Thus, the common mode rejection filter is arranged at the far end of the first length of transmission line and its first pair of terminals is connected at the far end of the first length of transmission line, the dipole is arranged perpendicular to the transmission line and is connected to the common mode rejection filter via a second length of transmission line and via a second pair of terminals.

It is thus possible to design antennas having a dipole at a certain height above the ground plane, but having the first length of transmission lines of varying lengths. It is possible to translate the position of the filter along the axis of the transmission lines by changing the lengths of the first and second part of the transmission line.

In particular, a proposed embodiment of the common mode rejection filter is in the form of two intertwined coils, where each coil is connected to one dipole arm and one transmission line conductor as seen in FIGS. 3 and 4.

When using multiple instances of the antenna in an array antenna, two additional techniques may be used. The first technique involves arranging a corrugated ground plane below the combined antennas to obtain a suitable impedance matching of the monopole/common mode excitation, see FIG. 5. The second technique involves arranging one or more dielectric layers above and parallel to the plane where the dipoles reside, in order to match the dipole element for wide angle scanning, e.g. in an H-plane, the H-plane being defined by the dipole antenna element.

The invention described above could be used in conjunction with

A feed network that creates an excitation that is a linear combination of a common-mode and a differential mode.

A conversion of the dual-conductor transmission line below the ground plane to two independent transmission lines, e.g. by using coaxial connectors.

The Inventive Concept

The combined antenna element according to the invention comprises a transmission line, a filter and a dipole as described above. The transmission line is able to support currents in common mode as well as in differential mode, e.g. a shielded pair. The differential mode is suitable for exciting dipoles. In this invention, the conventional balun—a device which converts e.g. coaxial transmission-line geometry to a symmetric two-conductor geometry—is here omitted since the phase control circuitry at the other end of the transmission line presumes a symmetric, two-conductor geometry.

To explain the basic function of the antenna, an antenna without a filter may be considered. We will assume that the transmission line is a shielded pair transmission line that ends in a large ground plane. The inner conductors protrude from the ground plane and are connected to a symmetric antenna element. If the antenna is excited with a differential mode, the dipole part of antenna element will radiate and reversely, if an incoming wave is received by the dipole element, it would induce a differential mode in the transmission line. The resonant frequency for the dipole part of the antenna element is primarily determined by the dipole geometry, including distance to the ground plane, but not on the transmission line geometry.

On the other hand, if such an antenna is excited with a common mode, the part of the transmission line that protrudes from the ground plane and together with the dipole will act as a monopole antenna. The resonance frequency is determined by the sum of the length of the protruding part of the transmission line and the half length of the dipole. Such an antenna is approximately resonant when that sum is a quarter of a wavelength. Consequently, the resonant frequency of the common-mode excitation is lower than the resonant frequency of the differential-mode excitation, which is resonant when the dipole length is a half wavelength. Since the dipole is often positioned a quarter of a wavelength from the ground plane, the resulting resonance frequency for the common-mode excitation is half of the resonance frequency for the differential-mode excitation.

In FIG. 1 is shown an antenna created from a paired transmission line. The antenna will operate as a monopole if the antenna is excited with a common-mode and as a dipole if the antenna is excited with a differential-mode. Due to the geometry the resonant frequency will be different for the two modes, (i.e. $\lambda_m \neq \lambda_d$).

Now turning to FIG. 2, central for this patent application is the addition of a filter that changes the resonant frequency of the common mode excitation, and in particular changes it to that of the differential mode resonance frequency. The resonance frequency of the monopole can be increased by reflecting the currents before they reach the dipole part of the element when the antenna is excited with the common mode. Furthermore, the dipole part of the antenna element should still be excited by the differential mode. This is done in this innovation with a filter that works as a common-mode rejection filter. The transmission line may be arranged to have different lengths to tune the monopole resonance frequency, the first resonance occurs when the distance from the ground plane to the filter is a quarter of a wavelength.

It must be emphasized that this filter is not designed to reduce the effect of the common mode at the ports or to prevent excitation of the common mode in the antenna as is often done in other applications. The idea is the opposite; the intension is to use the common mode to create an additional antenna element.

In FIG. 2 is shown an antenna provided with a common-mode rejection filter. The filter reduces the resonant length of the monopole. By moving the filter up or down along the transmission line the resonant length of the monopole can be changed. It is possible to tune the modes so that they will be resonant for the same frequency, (i.e. $\lambda'_m = \lambda_d$).

The Problem

In many antenna applications it is desirable to receive radio signals from all possible directions. However, the radiation pattern of an antenna element is never completely omni-directional. There is always a direction from which an antenna element receives less power compared to the best direction. For straight wire elements, such as dipoles and monopoles, the radiation pattern has a null in the direction of the wire(s).

Additional nulls might arise when arranging antenna elements on top of a ground plane. A dipole above and parallel to a large ground plane can be modeled as two parallel dipoles, where the second dipole is the mirror image in the ground plane of the first dipole. The second dipole will have a current that is directed in the opposite direction of the current on the first dipole, and consequently the combined radiation pattern of the two dipoles will cancel in radiation directions that are parallel to the ground plane. On the other hand, a monopole protruding orthogonally from a large ground plane will have its radiation maxima in the plane of the ground plane but has a radiation null in the normal direction of the ground plane.

This invention is intended to reduce the problem with nulls or local minima in the radiation pattern for antenna systems were nulls are undesirable.

The Solution

The object of the invention is to reduce the problem with nulls or local minima in the radiation pattern for antenna systems were nulls are undesirable. The reduction is made by combining two antenna elements with fundamentally different radiation patterns, a dipole parallel to the ground plane and a monopole orthogonal to the ground plane. The two antenna elements have by means of inventive features given the same resonance frequency, and by selecting between these two elements the null directions are reduced.

Thus, according to a first aspect of the invention there is provided an antenna comprising
a dipole antenna element having central feeding points;
a common mode rejection filter;
a two-conductor transmission line;
wherein the two-conductor transmission line is arranged to extend from a ground plane to a first height (h) where it is connected to a common mode rejection filter which is both arranged and connected between a far end of the two-conductor transmission line and the feeding points of the dipole.

The antenna according to above wherein there is arranged a length of transmission line to make the connection between the filter and the dipole and to enable placement of the dipole on a second height above the ground plane regardless of a physical dimension of the filter and the first height The antenna according to above wherein the dipole is arranged and connected directly on top of the filter.

The antenna according to above wherein a first end of the two conductor transmission line is to be connected to a transmitter and/or a receiver, and a second end of the two conductor transmission line is connected to a first end of the common-mode rejection filter and a second end of the common mode rejection filter is connected to the dipole portion The antenna according to above wherein the two conductor transmission line is arranged to transfer currents in an arbitrary combination of a common mode and a differential mode.

The antenna according to above wherein the common mode rejection filter is designed to prevent a common-mode current from entering the dipole part of the antenna, while it lets a differential-mode current pass through in order to excite the dipole.

The antenna according to above wherein the common mode rejection filter is designed as two intertwined coils.

The antenna according to above, wherein each coil is connected to one dipole arm, and one transmission line conductor.

The antenna according to above, wherein a corrugated ground plane is arranged to obtain a suitable impedance matching of a monopole/common mode excitation.

The antenna according to above, wherein one or more dielectric layers are arranged above the dipole portion.

The antenna according to above wherein the dielectric layer(s) is/are arranged parallel to the plane wherein the dipole resides.

The antenna according to above, wherein the two conductor transmission line and the length of transmission line above the filter at the same time constitutes active and structural elements of the antenna.

According to a second aspect of the invention there is provided an antenna array comprising multiple antenna elements according to above, and having a common ground plane.

The antenna array according to above wherein the ground plane is corrugated.

The antenna array according to above or the antenna according to above wherein one or more dielectric layers are arranged above the dipole portions.

The antenna array according to above wherein the dielectric layer(s) is/are arranged parallel to the plane wherein the dipoles reside.

According to a third aspect of the invention there is provided a method for using an array antenna according to above for radar purposes including the following steps:
exciting the array antenna with a radar pulse signal in differential mode
phase-shifting the pulse signal in differential mode between array antenna elements to achieve scanning
receiving radar echoes signals;
processing radar echoes signals
exciting the array antenna with a radar pulse signal in common mode
phase-shifting the pulse signal in common mode between array antenna elements to achieve scanning
receiving radar echoes signals;
processing radar echoes signals.

BRIEF DESCRIPTION OF THE DRAWINGS

The invention will now be further explained with the aid of one or more embodiments of the invention in conjunction with the accompanying drawings of which.

DETAILED DESCRIPTION

Definitions and Symbols

The following terms and symbols will be used in this document with the following well defined meanings:

"antenna element" is a term having two meanings. In single antenna terminology, an antenna comprises antenna elements, i.e., antenna parts. In array antenna terminology, an antenna element is one of the antennas in the array.

"baffle" is used to denote a sheet of conducting material arranged in the vicinity of an antenna to create a corrugated ground plane that improves or alters the resonance frequency of the antenna.

"dipole antenna" is an antenna consisting of two straight conductors of rod or wire of equal length, oriented parallel and collinear with each other and with a small space between them.

"monopole antenna" is an antenna consisting of a straight rod-shaped conductor, often mounted perpendicularly over some type of conductive surface, called a ground plane "$\lambda_m$" is used to denote the resonant wavelength for a monopole antenna.

"$\lambda_d$" is used to denote the resonant wavelength for a dipole antenna.

"$\lambda'_m$" is used to denote the resonant wavelength for a monopole antenna provided with a filter according to the invention.

"interelement distance" is used to denote the distance between two antenna elements, usually in an antenna array.

"interbaffle distance" is used to denote the distance between two baffles

"array antenna" is a term denoting multiple antennas arranged in a pattern and connected to create an antenna with better characteristics than a single antenna.

"linear array (antenna)" is a term denoting an antenna array where the array is arranged in a straight line this is called a linear array.

"l" and "LD" is used interchangeably to denote dipole length.

"port" is used herein to denote a cross section of a transmission line were incoming and reflected waves are excited and received and is one of the points from which the length of the transmission line is measured. The port is often located at the intended position of a connector or the cross-section of the transmission line and the ground plane.

"corrugated"; a ground plane is corrugated when it is not plane (flat) but wavy and/or provided with baffles.

"WAIM", Wide Angle Impedance Matching

"MIMO", Multiple In, Multiple Out

Figure 1:
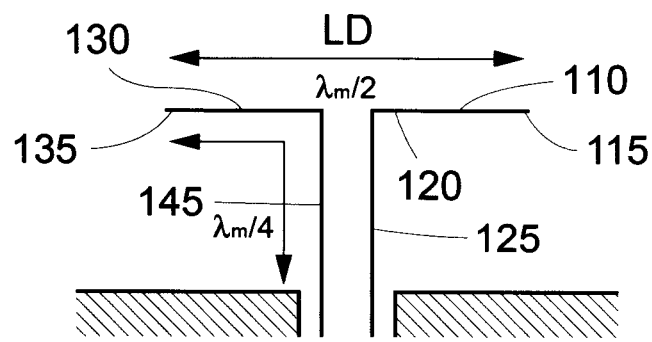
FIG. 1 shows a perspective view of a combination antenna created from a paired transmission line.

FIG. 1 shows a perspective view of a combination antenna created from a paired transmission line 145, 125. A dipole portion 130, 110) comprises a left arm 130 and a right arm 110, each arm being a metal conductor of rod or wire, oriented parallel and collinear with each other with a small space between them. The antenna will operate as a monopole if the antenna is excited with a common-mode signal and as a dipole if the antenna is excited with a differential-mode signal. Due to the geometry the resonant frequency will be different for the two modes, (i.e. $\lambda_m \neq \lambda_d$).

Figure 2A:
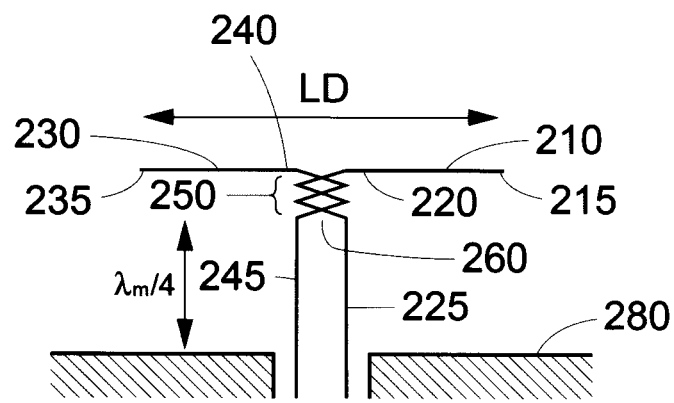
FIG. 2a shows a combination antenna provided with a common-mode rejection filter.

FIG. 2a shows a combination antenna with dipole 210, 230 and monopole 225, 245 portions, and provided with a common-mode rejection filter 250. The filter 250 is connected between the distal end 260 of the paired transmission line 225, 245 and the dipole's feeding points 240, 220. The filter 250 reduces the resonant length of the monopole formed by the transmission line 225, 245. By moving the filter up or down along the transmission line 225, 245 the resonant length of the monopole can be changed. It is possible to tune the modes so that they will be resonant for the same frequency, (i.e. $\lambda'_m=\lambda_d$). This will be shown in a separate example below.

Figure 2B:
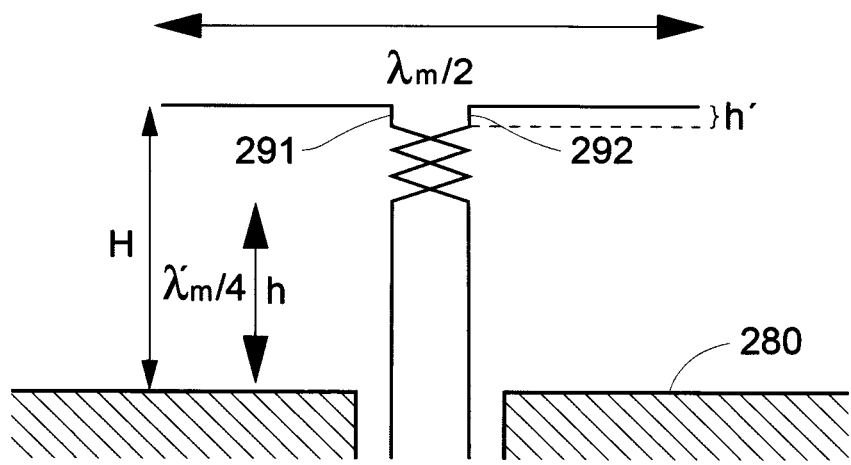
FIG. 2b shows the combination antenna of FIG. 2a further provided with a length of transmission line above the filter.

FIG. 2b shows a combination antenna similar to the one shown in FIG. 2a. The antenna of FIG. 2b, however, is further provided with a second length of two conductor transmission line 291, 292 with length h' close to the dipole part, arranged between upper terminals of the filter and the terminals of the dipole. The transmission line beneath the filter may then advantageously be referred to as "the first length of two conductor transmission line" 245, 225. The advantage of providing this further length of transmission line above the filter is that the height H of the dipole 210, 230 above the ground plane 280 may be controlled without affecting the length h of the transmission line 245, 225 provided to act as a monopole, which length h therefore should be a fixed length of approximately a quarter of the wavelength used. It is therefore advantageous, since it is much easier to adjust the length of the dipole and the length of the transmission line below the filter, such that their resonant frequencies become the same, and still being able to have the dipole on a height H above the ground plane that is most favourable from an antenna designer's point of view. It is clear from e.g. FIG. 2b that the first length of transmission line and the second length of transmission line both are arranged having their length axes in the same direction and that the length axis of the dipole is arranged in a direction orthogonal to that direction Excitation Modes At common mode excitation mode, i.e., when the same signal is applied to both leads, the filter blocks the signal to the dipole which becomes inactive, and plays a role that can be interpreted as "nonexistent". The twin first length of the two conductor transmission line therefore comes to play the role of two parallel monopoles excited by the same signal.

At differential mode excitation, i.e., when there is a phase difference of 180 degrees between the applied signals, the filter lets the signal pass to the dipole which becomes active, and plays a role that can be interpreted as a dipole antenna. The twin lead transmission line, i.e., the portion up to the filter, comes to play the role of two parallel leads excited by signals with 180 degree phase difference, and will therefore not contribute for radiation as a monopole.

Realization of the Filter

Figure 3A:
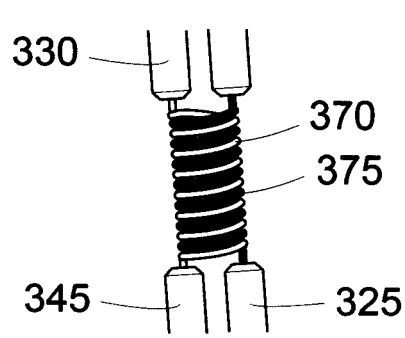
FIG. 3a shows a first embodiment of a compact common-mode rejection filter.

As an example, a suitable common-mode rejection filter can be realized using two intertwined solenoids. There are two possibilities to connect the solenoids. The first possibility is a transformer where one coil is connected to the dipole part of the antenna element, between left arm 230 and right arm 210, and one coil is connected to the transmission line between the left conductor 245 of the transmission line, and the right conductor 225 of the transmission line. The second possibility—and the one that will be discussed in this application in more detail—is when each coil is connected between one dipole arm 230, 210 and one transmission line conductor 245, 345, 225, 325 as is best seen in FIG. 3a. In the latter case, the current in one coil will induce a current in itself that is directed opposite in direction to the current in the coil, due to Lentz law and an almost equally strong current in the other coil due to strong mutual impedance.

Ferrites could be used in the core of the coils for those frequencies were the ferrites are suitable to increase the inductance and mutual impedance of the coils and thereby reduce the size of the filter.

Coil Filters

Figure 3B:
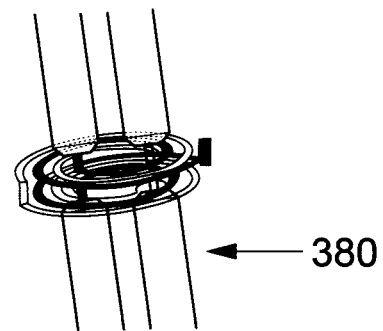
FIG. 3b shows a second embodiment of a compact common-mode rejection filter.
Figure 3C:
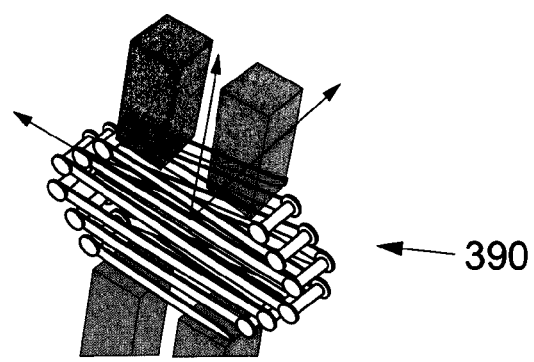
FIG. 3c shows a third embodiment of a compact common-mode rejection filter.

FIGS. 3a, 3b, and 3c shows three realizations of the common-mode rejection filter.

The first realization of the filter consists of two helical coils 370, 375, FIG. 3a. This type of coil could easily be manufactured by winding wires on a tube; this tube could then be used as a supporting structure for the transmission line. FIG. 3b shows a spiral coil 380. This coil 380 could be manufactured using a planar circuit board parallel to the ground plane and coplanar with the dipole; several layers could be used to increase the number of planar coils and the inductance without increasing the diameter of the coil for a fixed conductor width and inter conductor spacing. FIG. 3c shows a coil 390 that could be made using planar circuit boards and where the coils' axis is in the substrate plane. This is practical since the same substrate could be used to support dipole, filter and the transmission line. The coils of the present invention are compact. If the filter would be large compared to the dipole length and the distance between the ground plane and the plane containing the dipoles is close to a quarter of a wavelength, the resonant length of the monopole becomes shorter than the dipole, which would prevent the dipole and the monopole to be resonant at the same frequency. Therefore the filters of the present invention are arranged to be compact.

The filter may be realized with different number of turns.

Antenna-Filter Example

Figure 4A:
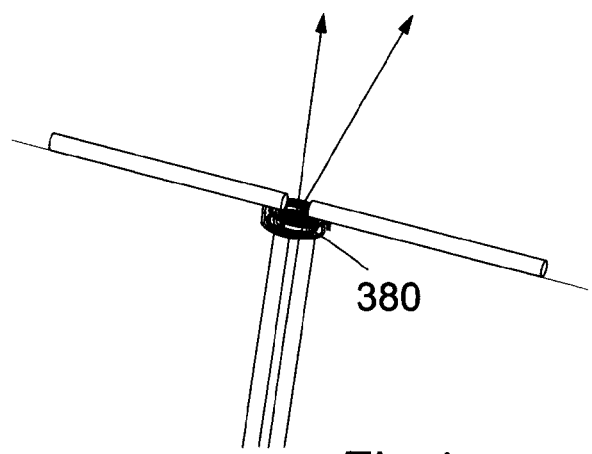
FIGS. 4a and 4b shows antenna arrangement.
Figure 4B:
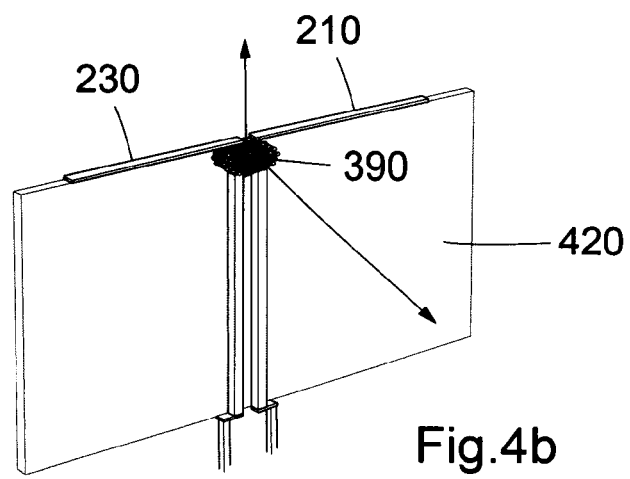

FIGS. 4a and 4b shows two examples of how the filter is included in an antenna design. The filter length along the direction of the transmission line is arranged to be short; so that the transmission line length is long enough to make the monopole resonant at the same frequency as the dipole. In FIG. 4b is shown an antenna printed upon a substrate 420. The substrate 420 is mounted upon a ground plane (not depicted in the figure) with two coaxial connectors. The common-mode and differential mode is created by exciting the ports with equal amplitude in phase or anti-phase respectively. An antenna such as this one may be used to increase the polarization diversity of a system since the monopole and dipole have orthogonal polarization in the dipoles H-plane. Alternatively the antenna could be used in a MIMO application.

Element in an Array Antenna

Figure 4C:
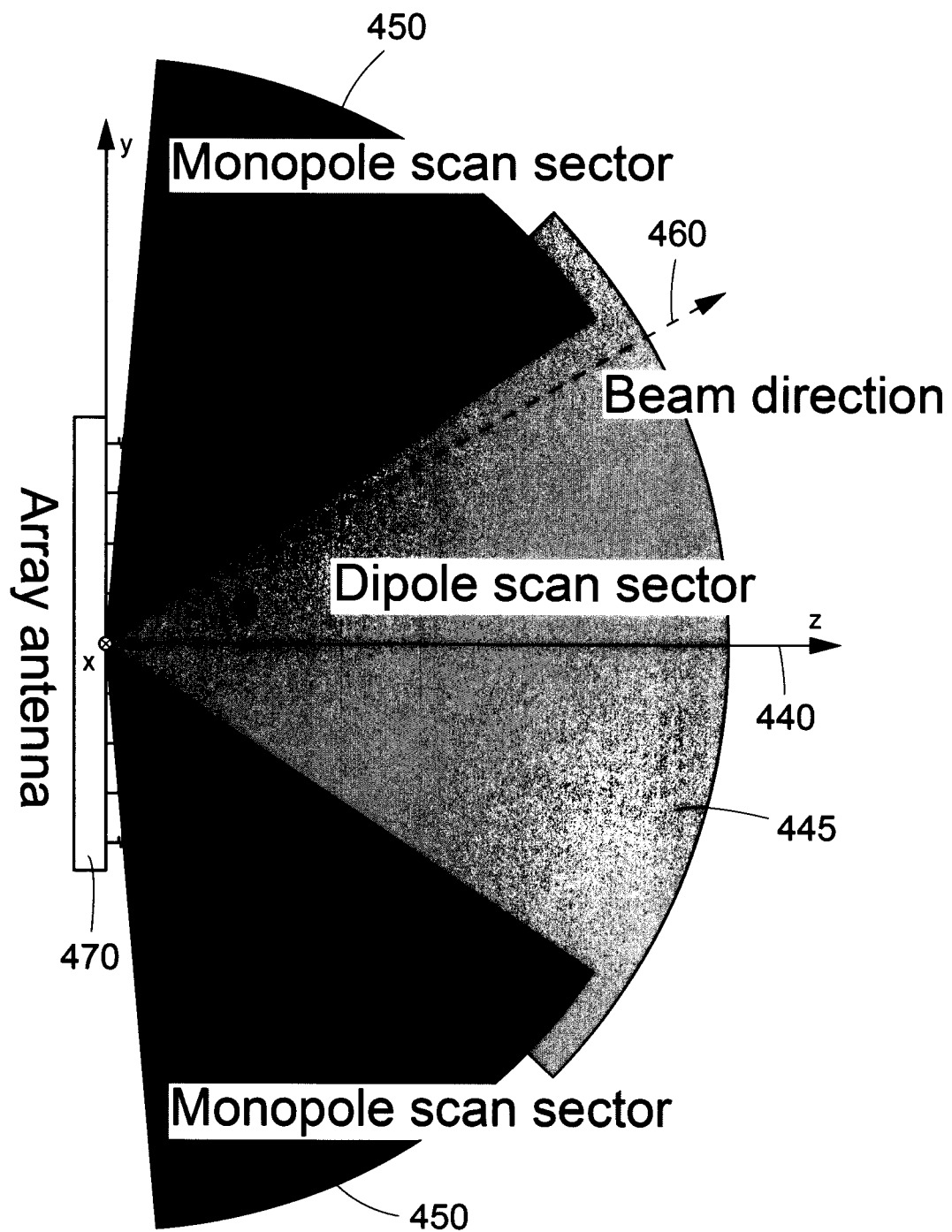
FIG. 4c shows in a view from above, a combined scan sector for an array antenna

The antenna element is primarily envisioned to be used in, but not restricted to, large array antennas that are scanned to large scan angles. Both monopole and dipoles could be used for close to end-fire scanning in a plane that is the H-plane of the dipole. The large array is assumed to be excited with a linear phase shift. To include the effect of mutual coupling, the input impedance is in this document the active input impedance. Thus the input impedance of the antenna is a function of phase shift, i.e. a function of scan direction. The impedance changes when the antenna is scanned from broadside radiation towards end-fire and it is desirable that the antenna becomes well-matched for a specified scan sector. For the antenna element of the present invention the scan sectors that will fulfill a specific requirement, e.g. the active reflection coefficient is below −10 dB, will be different in size for the common-mode monopole and the differential-mode dipole. By combining the two modes scan sectors it is possible to increase total scan sector of the array antenna. This is a particularly valuable feature when the array is scanned in directions where one of the elements has a radiation null, e.g. broadside scan for the monopole or close to end-fire in the E-plane for a dipole. FIG. 4c shows in a view from above, combined scan sectors 445, 450 for an array antenna 470 using antenna elements of the inventive design as described in this document. A dipole scan sector 445 and a monopole scan sector 450 may thus be achieved by exciting in differential and common mode, respectively, in combination with the application of phase shift between antenna elements, as described above.

Wide Impedance Matching Layers

To improve the wide angle scanning performance for the dipole in the H-plane dielectric layers are put on top of the antenna. These layers can be modeled as a susceptance that changes value depending on the incidence angle and polarization.

Another useful feature of a dielectric layers that are close to the element is that they can be used to reduce the size antenna element. Resonance occurs when the effective length of the dipole part of the antenna equals one half of the wavelength in free space. A dielectric sheet on top of an element will reduce the effective wavelength, which in turn makes the resonant length of the element shorter and the element can be made smaller. Compact elements are important for one reason in particular, it makes it easier to pack element close together. To avoid grating lobes in rectangular grid arrays, the inter element spacing must be made smaller than half a wavelength for the antennas highest operational frequency.

Use of Baffles to Match the Monopole

A problem that might arise when using a transmission line with two modes is that there are limitations for what you can change to match one element without affecting the matching of the other element. The above described filter is a device that allows this and dielectric layers 505, 507 may be used with the same intention. Baffles 510 are devices that can be used to match the monopole part of the antenna element with little effect on the monopole. The baffles 510 protrude from the ground plane 520 and are parallel with the dipole antennas 210, 230, see FIG. 5.

These baffles 510 can change the impedance (resistance and reactance) of the monopole (as seen from the transmission line at the interface of the ground plane). In combination with the filter position, it becomes possible to control both the input resistance and reactance of the monopole to a certain degree and thereby improving the matching to the common mode transmission line characteristic impedance. Alternatively, the element can be excited by two coaxial ports and the baffles can then be used to match the element to the active impedance of the coaxial ports. The baffles could be placed with a periodicity equal to the interelement distance along the H-plane of the dipole part of the antenna element divided by an even integer. A shorter interbaffle distance DIB will yield similar results as longer interbaffle distance is used but together with an increase in baffle length or thickness.

Figure 5A:
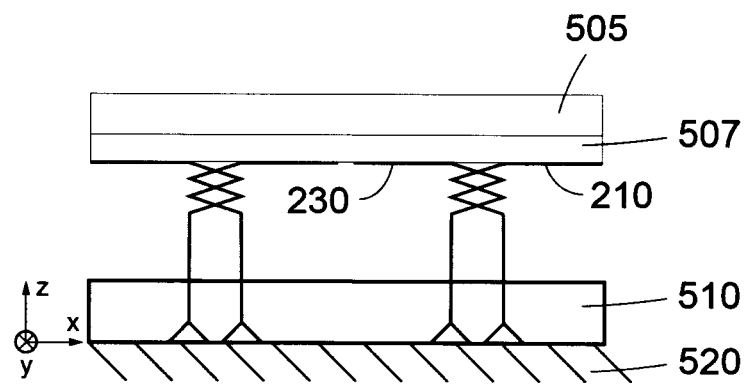
FIGS. 5a, and 5b, shows examples of array antenna arrangements improved with dielectric layer(s) and baffles.
Figure 5B:
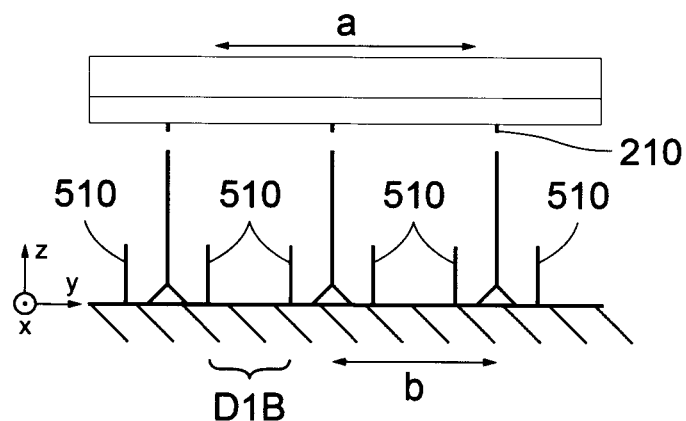

Baffles have previously been used to reduce the coupling between elements in arrays of dipoles or slot elements. In antenna arrays of dipoles baffles can be used to match the dipoles for large scan angles in the E-plane, which is not the intended scan direction in this invention. Unlike in those arrays the function here is to match the monopole part of the element rather than increasing the dipole element. FIGS. 5a and 5b shows an example of an array with baffles and WAIM.

Thus, the present application describes an inventive antenna element. The antenna element is a combination of a dipole and a monopole, connected by means of a transmission line that supports a common mode and a differential mode. By exciting the antenna with the common-mode the monopole is excited and by exciting the differential-mode the dipole part of the antenna element is excited.

A key feature of this design is a common-mode rejection filter that is used to prevent currents from entering the dipole arms when excited with the common mode. This makes it possible to design the monopole part of the antenna element so that it has the same resonance frequency as the dipole part of the antenna element.

The antenna element can be used stand-alone as well as in large arrays. Dielectric layers on top of an array are can be used to reduce the size of the antenna elements and to match the antenna for large scan angles. Furthermore, baffles between the elements can be used to change the input impedance of the monopole. These baffles can in combination with a proper choice of the filter position be used to match the monopole antenna without significantly changing the matching of the dipole.

Method

A method for using an array antenna according to the invention for radar purposes may include the following steps:

exciting the array antenna with a radar pulse signal in differential mode phase-shifting the pulse signal in differential mode between array antenna elements to achieve scanning receiving radar echoes signals;

processing radar echoes signals exciting the array antenna with a radar pulse signal in common mode phase-shifting the pulse signal in common mode between array antenna elements to achieve scanning receiving radar echoes signals;

processing radar echoes signals

EXAMPLES

Example 1 Single Antenna

Figure 6:
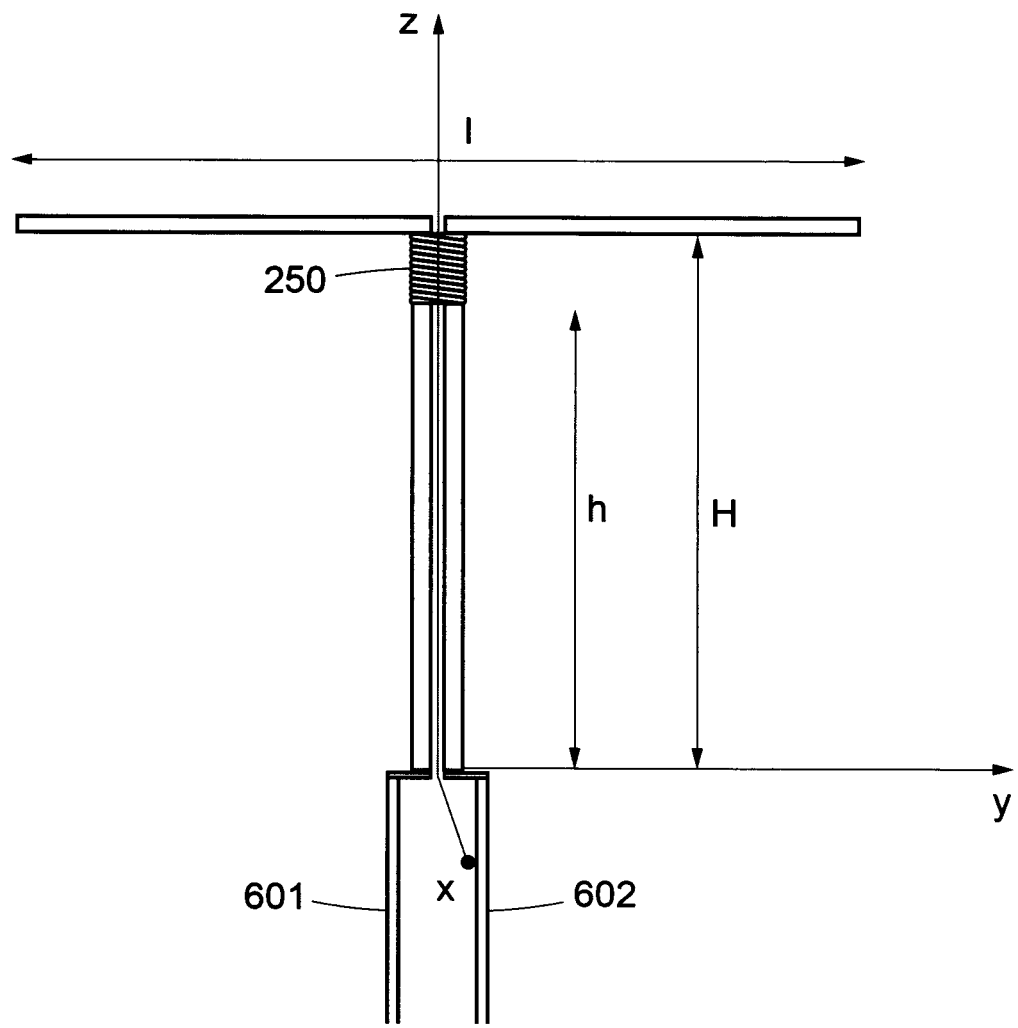
FIG. 6 shows a combination antenna with certain parameters marked.

Now referring to FIG. 6, this shows a single antenna over a ground plane, and fed by two coaxial cables 601, 602. The dipole has a length l, and it is positioned on a dipole height H, above the ground plane. The filter 250 is positioned so that its lowest point is arranged on a filter height h, above the ground plane. This filter height also corresponds to, or rather are equal to, the first length of the two conductor transmission line. In the following two examples the dipole length and the filter position is changed but the dipole height, H, is constant. The results are given as reflection coefficients for the common mode (dashed curves) and the differential mode (solid curves). The common mode is equivalent to the active reflection coefficient for the monopole excitation and the differential mode is equivalent to the active reflection coefficient for the dipole excitation.

Figure 7A:
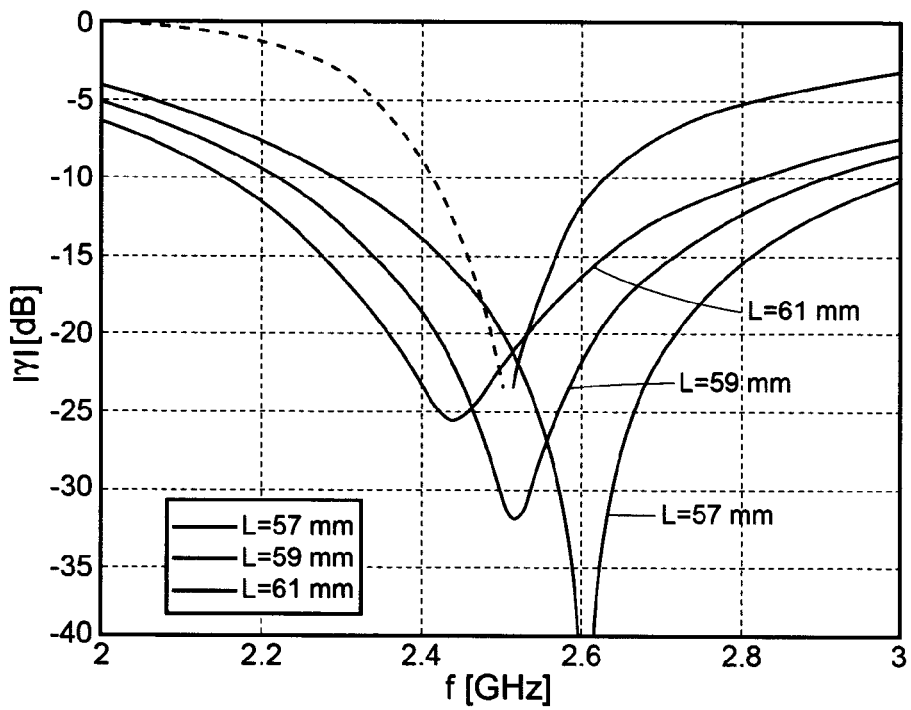
FIGS. 7a, 7b shows a graph representing the antenna's reflection coefficient as a function of frequency for a single antenna when varying dipole length and monopole height, and divided for common mode and differential mode excitation respectively.
Figure 7B:
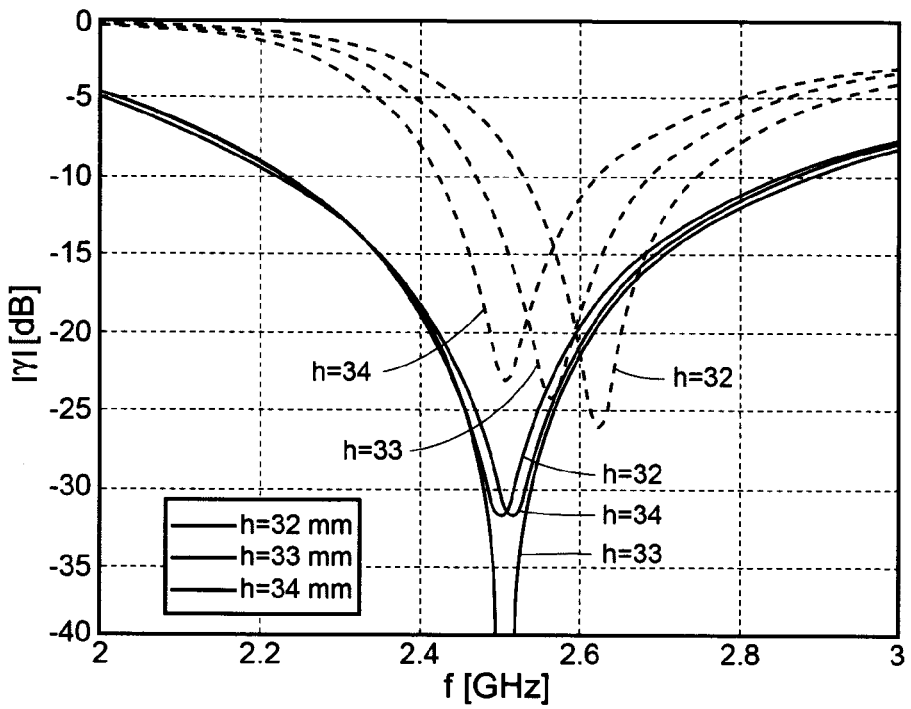

Thus, FIGS. 7a and 7b shows graphs representing the antenna's reflection coefficient as a function of frequency for a single antenna when varying dipole length and monopole height, and divided for common mode and differential mode excitation respectively. Results for common mode excitation are shown as dashed curves, and results for differential mode excitation are shown as unbroken curves In the first example the reflection coefficients are calculated for dipole lengths, l, of 57, 59, and 61 mm respectively. The dipole height is fixed at H=39 mm and filter height fixed at h=34 mm. It is clear from the figure that the resonance frequency for the dipole changes as expected, i.e., decreases as dipole length, increases, and the resonance frequency of the monopole is unchanged due to the fact that common mode currents are prevented to enter the dipole by the filter 250.

Example 2 Single Antenna

In a second example the filter position above the ground plane, h, is changed between 32, 33, and 34 mm and H=39 mm and l=59 mm. Results from simulations are shown in FIG. 7b. The resonance frequency of the monopole shifts when h is changed. This is due to that the common mode is reflected at different positions in the antenna element. Furthermore, the resonance frequency of the dipole does not change since the filter lets the common mode pass through to the dipole.

ARRAY EXAMPLES

In the following array examples the array is assumed to be infinite in extent and the antenna is scanned in the dipole's H-plane. The scan angle, θ, is measured from the normal of the ground plane. The interelement distance in the dipole's H-plane is 50 mm, l=47 mm, h=32 mm, H=38 mm, and the baffle height, bh, is a parameter in the following examples. Furthermore, the antenna is covered by two dielectric sheets; the first counting from the dipole and in direct contact with the top side of the dipole is 5 mm thick and has a relative dielectric constant of 3. The second layer lies on top of the first layer and has a thickness of, $w_h$, and a relative dielectric constant of 2.

Figure 8A:
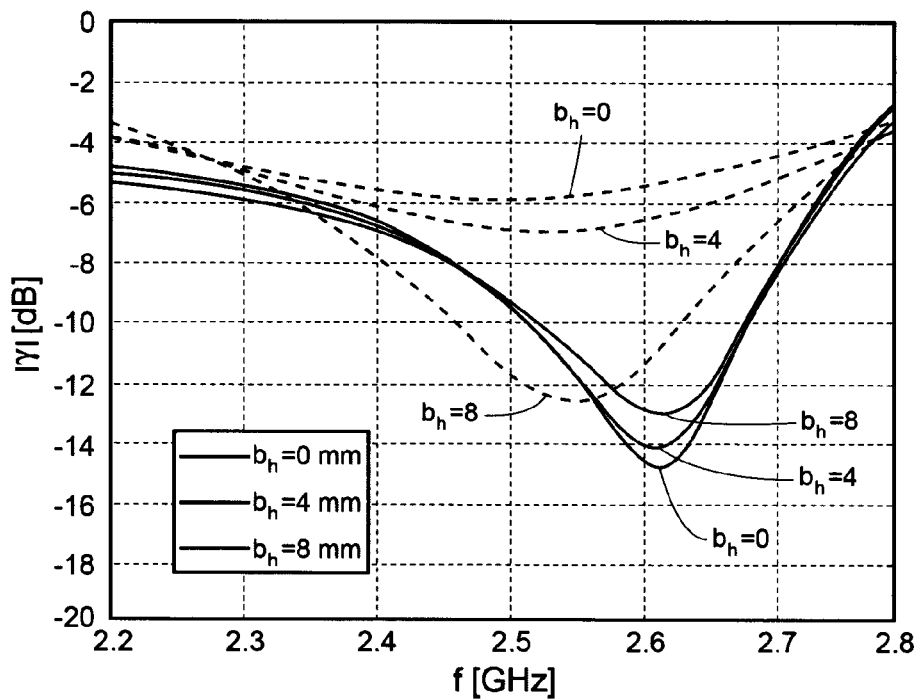
FIG. 8a, 8b shows a graph representing the antenna's reflection coefficient as a function of frequency for an array antenna when varying baffle height and top dielectric sheet thickness, and divided for common mode and differential mode excitation respectively.
Figure 8B:
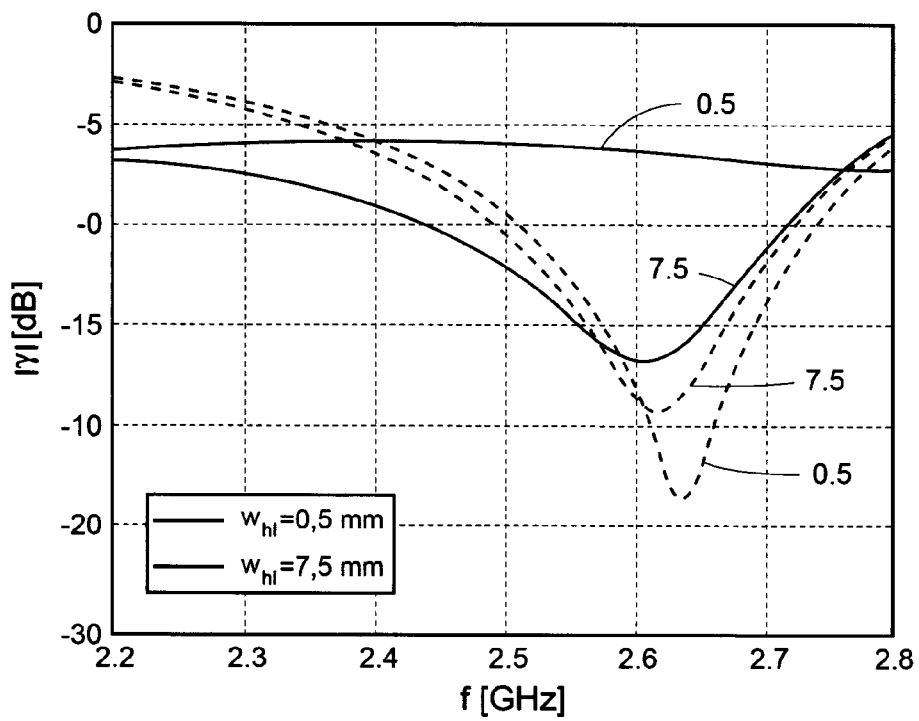

FIGS. 8a and 8b shows graphs representing the antenna's reflection coefficient as a function of frequency for an array antenna when varying baffle height and top dielectric sheet thickness, and divided for common mode and differential mode excitation respectively.

Example 3 Array Antenna

In the first array antenna example the baffle height, $b_h$, is changed between 0, 4, and 8 mm while, $w_h$=7.5 mm and θ=70°. It can be seen from FIG. 8a that the reflection coefficient for the common mode is changed when the height is changed, while the common mode is less affected.

Example 4 Array Antenna

In the second array antenna example the thickness of the top dielectric sheet, $w_h$, is changed between 0.5 and 7.5 mm, while $b_h$=8 mm and θ=60°. The results are given in FIG. 8b. In this figure it is shown what will happen if the top dielectric layer is made much thinner. The biggest change occurs for differential mode that has a reflection coefficient above −10 dB for all shown frequencies. The common mode on the other hand is less affected by the change of sheet height, although is not completely unaffected.

The invention claimed is:

1. An antenna, comprising:
   a dipole antenna element having central feeding;
   a common mode rejection filter,
   a first length of a two-conductor transmission line, and
   a common mode rejection filter arranged and connected between a far end of the first length of the two-conductor transmission line and the feeding points of the dipole antenna element,
   wherein the first length of the two-conductor transmission line is arranged to extend from a ground plane to a first height where the first length of the two-conductor transmission line is connected to the common mode rejection filter, and a second length of transmission line arranged to make a connection between the filter and the dipole and to enable placement of the dipole on a second height above the ground plane regardless of a physical dimension of the filter and the first height.

2. The antenna according to claim 1, wherein the dipole is arranged and connected directly on top of the filter.

3. The antenna according to claim 1, wherein a first end of the first length of the two conductor transmission line is connected to at least one of a transmitter or a receiver, and a second end of the first length of the two conductor transmission line is connected to a first end of the common-mode rejection filter, and a second end of the common mode rejection filter is connected to the dipole antenna element.

4. The antenna according to claim 3, wherein the first length of the two conductor transmission line is arranged to transfer currents in an arbitrary combination of a common mode and a differential mode.

5. The antenna according to claim 1, wherein the common mode rejection filter is designed to prevent a common-mode current from entering the dipole antenna element, which the common mode rejection filter lets a differential-mode current pass through in order to excite the dipole antenna element.

6. The antenna according to claim 1, wherein the common mode rejection filter is designed as two intertwined coils.

7. The antenna according to claim 6, wherein each coil is connected to one dipole arm, and to one first length of the transmission line conductor.

8. The antenna according to claim 1, further comprising:
   a corrugated ground plane arranged to obtain a suitable impedance matching of a monopole/common mode excitation.

9. The antenna according to claim 1, further comprising:
   at least one dielectric layer arranged above the dipole portion.

10. The antenna according to claim 9, wherein the at least one dielectric layer is arranged parallel to a plane wherein the dipole antenna element is arranged.

11. The antenna according to claim 1, wherein the first length of the two conductor transmission line and the second length of the two conductor transmission line above the common mode rejection filter at a same time constitute active and structural elements of the antenna.

12. An antenna array, comprising:
   multiple antenna elements having a common ground plane, each antenna element comprising
   a dipole antenna element having central feeding points,
   a common mode rejection filter,
   a first length of a two-conductor transmission line, and
   a common mode rejection filter arranged and connected between a far end of the first length of the two-conductor transmission line and the feeding points of the dipole antenna element,
   wherein the first length of the two-conductor transmission line is arranged to extend from a ground plane to a first height where the first length of the two-conductor transmission line is connected to the common mode rejection filter, and a second length of transmission line arranged to make a connection between the filter and the dipole and wherein the first length of the two conductor transmission line and the second length of the two conductor transmission line above the common mode rejection filter at a same time constitute active and structural elements of the antenna.

13. The antenna array according to claim 12, wherein the ground plane is corrugated.

14. The antenna array according to claim 12, further comprising:
- at least one dielectric layer arranged above the dipole antenna element of each antenna element.

15. The antenna array according to claim 14, wherein the at least one dielectric layer is arranged parallel to the plane wherein the dipole antenna elements are arranged.

16. A method for using an array antenna comprising a plurality of antenna elements having a common ground plane, each antenna element comprising a dipole antenna element having central feeding points, a common mode rejection filter, a first length of a two-conductor transmission line, and a common mode rejection filter arranged and connected between a far end of the first length of the two-conductor transmission line and the feeding points of the dipole antenna element, wherein the first length of the two-conductor transmission line is arranged to extend from a ground plane to a first height where the first length of the two-conductor transmission line is connected to the common mode rejection filter, the method comprising:
- exciting the array antenna with a radar pulse signal in differential mode;
- phase-shifting the pulse signal in differential mode between array antenna elements to achieve scanning;
- receiving radar echoes signals;
- processing radar echoes signals;
- exciting the array antenna with a radar pulse signal in common mode;
- phase-shifting the pulse signal in common mode between array antenna elements to achieve scanning;
- receiving radar echoes signals; and
- processing radar echoes signals.

* * * * *